United States Patent [19]

Hayashi et al.

[11] Patent Number: 4,612,002
[45] Date of Patent: Sep. 16, 1986

[54] DEVICE FOR CONTROLLING PINCH FORCE OF A PULLEY IN AN INFINITELY VARIABLE TRANSMISSION

[75] Inventors: Kiyotaka Hayashi, Urawa; Kohei Ohzono, Fujimi; Nobuyuki Yakigaya, Narashino, all of Japan

[73] Assignee: Honda Giken Kogyo K.K., Tokyo, Japan

[21] Appl. No.: 755,075

[22] Filed: Jul. 15, 1985

[30] Foreign Application Priority Data

Jul. 16, 1984 [JP] Japan ................................ 59-147340

[51] Int. Cl.[4] .............................................. F16H 11/06
[52] U.S. Cl. ......................................... 474/28; 474/11
[58] Field of Search .................... 474/11, 12, 8, 17, 18, 474/28, 69, 70

[56] References Cited

U.S. PATENT DOCUMENTS

| 4,152,947 | 5/1979 | Van Deursen et al. | 474/11 |
| 4,292,031 | 9/1981 | Rattunde | 474/28 X |
| 4,403,974 | 9/1983 | Sherman et al. | 474/28 X |
| 4,475,416 | 10/1984 | Underwood | 474/28 X |
| 4,541,821 | 9/1985 | Sakakibara | 474/11 X |

Primary Examiner—Stephen J. Novosad
Assistant Examiner—Thuy M. Bui
Attorney, Agent, or Firm—Arthur L. Lessler

[57] ABSTRACT

In an infinitely variable transmission equipped with a V-shaped pulley having a stationary pulley element and a movable pulley element fitted on a shaft, and an endless belt engaged between the pulley elements, a movable pulley element pinch force control device includes a plurality of through bores formed through the peripheral wall of the shaft in axially spaced relation, and a slider axially slidably received within a hydraulic fluid introducing passage in the shaft and urged by the fluid pressure in a direction of closing the through bores. The movable pulley element is urged by the fluid pressure in a direction of closing the through bores, and by the force of the belt in a direction of closing the through bores, whereby the total opening area of the through bores is automatically varied in response to changes in the positions of the slider and the movable pulley element, to control the pinch force of the movable pulley element in a stepwise manner.

4 Claims, 3 Drawing Figures

| FIG. 1A | FIG. 1B |

DEVICE FOR CONTROLLING PINCH FORCE OF A PULLEY IN AN INFINITELY VARIABLE TRANSMISSION

BACKGROUND OF THE INVENTION

This invention relates to a pulley pinch force control device for an infinitely variable transmission installed in an automotive vehicle.

Conventionally, a pulley pinch force control device for an infinitely variable transmission has been proposed, e.g by U.S. Pat. No. 4,152,947, which comprises a cylinder affixed to a shaft of a primary pulley and cooperating with a movable conical disc to define therebetween a cylinder space to be supplied with a hydraulic fluid for urgingly displace the movable conical disc relative to an immovable conical disc, an annular groove formed in an outer peripheral portion of the cylinder, a Pitot tube for measuring the fluid pressure in the annular groove which is dependent upon the speed of the primary pulley, and a control valve for controlling the pinch force of a secondary pulley in response to the fluid pressure measured by the Pitot tube.

However, the pulley pinch force control device of this type requires the provision of an annular groove, a Pitot tube, a control valve, etc., causing disadvantages such as complication in structure and pipe arrangement, and difficulty in laying out such component parts and their related parts.

SUMMARY OF THE INVENTION

It is an object of the invention to provide a pulley pinch force control device for an infinitely variable transmission, which has a simple structure and a compact overall size with a reduced number of component parts, and can be manufactured at low cost.

It is another object of the invention to provide a pulley pinch force control device for an infinitely variable transmission, which is capable of producing a required pinch force in a manner stepwise varying in dependence upon the transmission ratio of the transmission, to thereby improve the torque transmission efficiency and prolong the effective life of the component parts such as the pulleys and the belt.

The present invention provides a pulley pinch force control device for an infinitely variable transmission equipped with a pulley including a shaft having a hydraulic fluid introducing passage formed therein and a peripheral wall, a stationary pulley element provided on the shaft, a movable pulley element axially slidably fitted on the shaft and arranged opposite the stationary pulley element, a hydraulic pressure chamber communicating with the hydraulic fluid introducing passage and disposed to be supplied with a hydraulic fluid for urging the movable pulley element toward the stationary pulley element, a hydraulic fluid source for supplying the hydraulic fluid to the hydraulic pressure chamber, and an endless belt engaged between the stationary pulley element and the movable pulley element.

The pulley pinch force control device comprises: a plurality of through bores formed through the peripheral wall of the shaft in a manner axially spaced from each other with predetermined intervals, for communicating the hydraulic fluid introducing passage with the outside of the shaft, the through holes being disposed such that the movable pulley element is urged by the hydraulic fluid in the hydraulic pressure chamber in a direction of closing the through bores, and at the same time urged by a force of the endless belt acting thereupon against the hydraulic fluid in the hydraulic pressure chamber, in a direction of opening the through bores; a slider member axially slidably received within the hydraulic fluid introducing passage for opening and closing the through bores, the slider member having a pressure-receiving end surface urged by the hydraulic fluid in the hydraulic fluid introducing passage; and urging means urging the slider member in a direction of closing the through bores against the pressure of the hydraulic fluid acting upon the pressure-receiving end surface of the slider member; wherein the total opening area of the through bores is variable in response to a change in the position of the slider member which is determined by a difference between the pressure of the hydraulic fluid in the hydraulic fluid introducing passage and the urging force of the urging means, as well as to a change in the position of the movable pulley element which is determined by a difference between the pressure of the hydraulic fluid in the hydraulic pressure chamber and the force of the endless belt acting upon the movable pulley element, to cause a stepwise change of pressure in the hydraulic fluid introducing passage and accordingly pressure in the hydraulic pressure chamber, to thereby control the pinch force of the movable pulley element applied to the endless belt.

The above and other objects, features and advantages of the invention will be more apparent from the ensuing detailed description taken in conjunction with the accompanying drawings.

DETAILED DESCRIPTION

The invention will now be described in detail with reference to the accompanying drawings showing an embodiment thereof.

Figures 1, 1A:
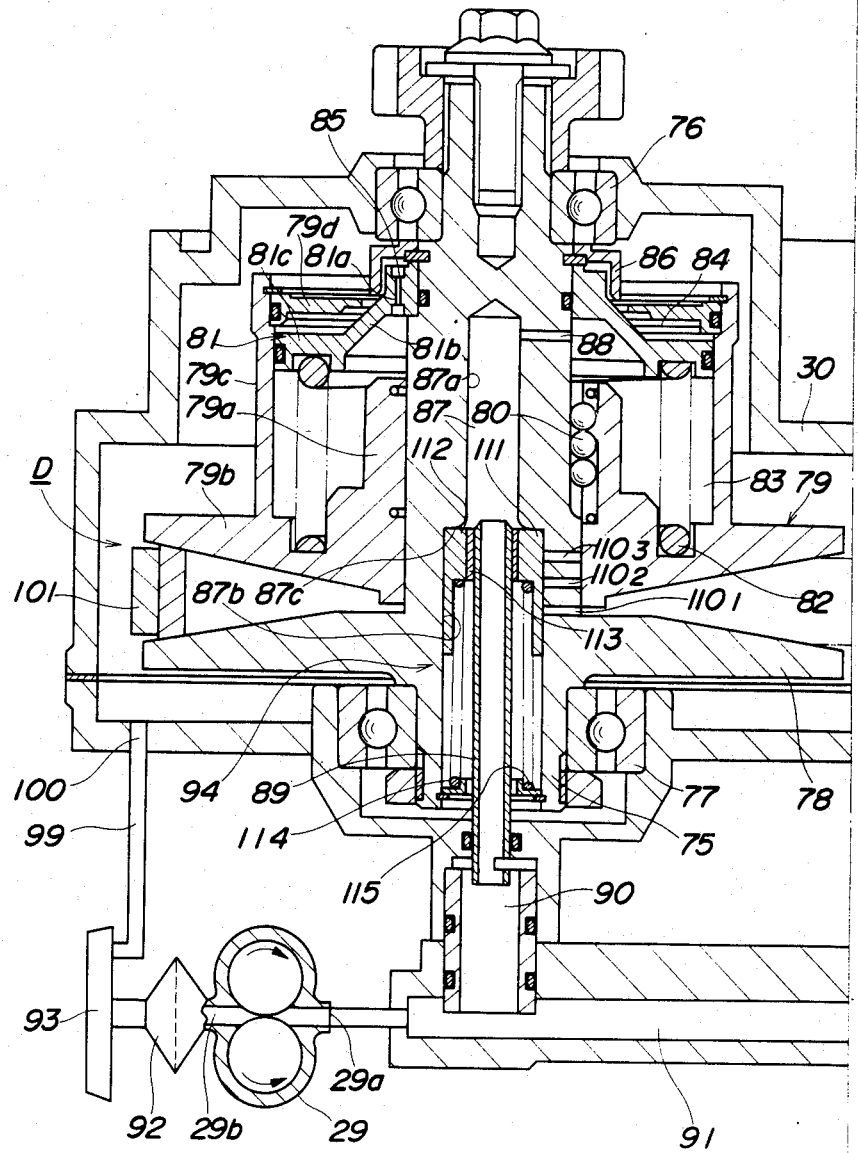
FIGS. 1A and 1B show the left and right hand sectional view of an infinite variable transmission provided with a pulley pinch force control device according to an embodiment of the invention.
Figure 1B:
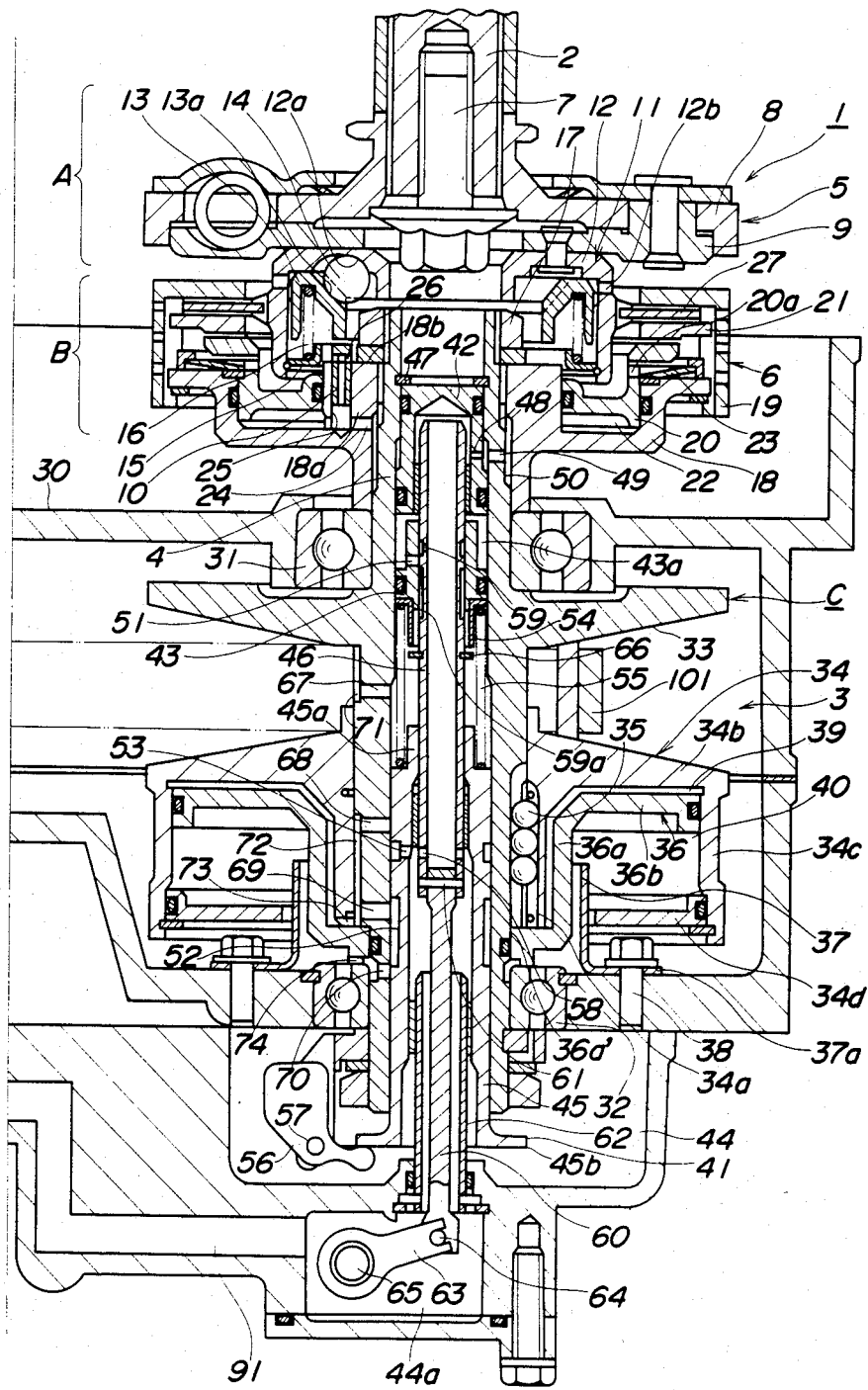

Referring first to FIGS. 1A and 1B, there is illustrated an infinitely variable transmission for automotive vehicles, equipped with a pulley pinch force control device according to the invention. Reference numeral 1 designates a starting clutch which is interposed between an input shaft 2 coupled to an output shaft of an internal combustion engine, not shown, for rotation in unison therewith, and a drive shaft 4 of an automatic transmission 3, serving as an output shaft. The starting clutch 1 has an input rotating member 5 disposed to rotate in unison with the input shaft 2, and an output rotating member 6 disposed to rotate in unison with the drive shaft 4.

The input rotating member 5 comprises a disc 8 spline fitted on the input shaft 2 and secured thereto by means of a bolt 7, to which is attached a clutch damper 9 of a known type. Control means 11 for controlling a pressure regulating valve 10, hereinafter referred to, is mounted on the input rotating member 5 at its surface facing the output rotating member 6. The control means 11 is of a centrifugal governor type and has a cam plate 13 axially slidably received within a housing 12 riveted to the input rotating member 5, and balls 14 radially movably interposed between a cam surface 13a of the cam plate 13 and a guide surface 12a of the housing 12. The cam plate 13 is urged toward the input rotating member 5 by a coiled spring 16 interposed between the cam plate 13 and a spring seat member 15. When the rotational speed of the input shaft 2 is lower than a predetermined value, the balls 14 is biased in a radially inner position whereby the cam plate 13 is urgedly biased toward the input rotating member 5 by the force of the spring 16. As the rotational speed of the input shaft 2 increases above the predetermined value, the balls 14 move radially outward due to its own centrifugal force to cause the cam plate 13 to be correspondingly displaced toward the output rotating member 6 against the urging force of the spring 16.

The output rotating member 6 comprises a clutch cylinder 18 spline fitted on the drive shaft 4 and secured thereto by means of a nut 17, and a clutch outer member 19 rigidly fitted on the clutch cylinder 18 in a manner prohibited from moving circumferentially or axially relative to the clutch cylinder 18. A clutch piston 20 as an urging member is axially slidably received within the cylinder 18 to be operated by a hydraulic fluid or pressurized oil introduced into a hydraulic pressure chamber 22 defined between the piston 20 and the cylinder 18, to urge clutch plates 21 and 27 as friction plates, hereinafter referred to. The piston 20 is urged by a belleville spring 23 toward the output rotating member 6, i.e. in a direction of disengaging the clutch.

The hydraulic pressure chamber 22 is supplied with hydraulic fluid via an inlet port 24 radially extending through a boss 18a of the cylinder 18. A bore 25 serving as an outlet port of the hydraulic pressure chamber 22 is axially formed through the boss 18a of the cylinder 18, within which the aforementioned pressure regulating valve 10 is slidably received. The bore 25 communicates at one end with the inlet port 24 and opens at its other end in an end face 18b of the boss 18a of the cylinder 18 facing the input rotating member 5. The pressure regulating valve 10 can move through a predetermined stroke in the axial direction of the drive shaft 4, and comprises a hollow cylindrical valve body having an open end adjacent the inlet port 24 and 9 closed other end. The closed end of the pressure regulating valve 10 is normally held in contact with an end face of the cam plate 13 facing the output rotating member 6, by the pressure of hydraulic fluid. Radial outlet ports 26 are formed through the peripheral wall of the hollow valve body 10 at a location in the vicinity of its closed end.

When the rotational speed of the input shaft 2 is lower than the predetermined value, the pressure regulating valve 10 is biased toward the input rotating member 5 by the hydraulic fluid supplied through the inlet port 24, whereby the outlet ports 26 are open to discharge the hydraulic fluid within the hydraulic pressure chamber 22 through the outlet ports 26. Therefore, the pressure in the chamber 22 is not so high, thereby holding the piston 20 in a position biased toward the output rotating member 6 by the urging force of the spring 23. On the other hand, when the rotational speed of the input shaft 2 is higher than the predetermined value, the pressure regulating valve 10 is urgedly displaced by the cam plate 13 toward the output rotating member 6, to thus reduce the opening area of the outlet ports 26, whereby the pressure in the hydraulic pressure chamber 22 is regulated in dependence on the ratio in opening area between the outlet ports 26 and an orifice 48 hereinafter referred to.

The clutch plate 21, which is disposed to be urged by the piston 20, is interposed between the input and output rotating members 5 and 6, and fitted in the clutch outer member 19 in urging contact with its inner peripheral surface in a manner circumferentially immovable but axially movable relative to the clutch outer member 19. The other clutch plate 27 is interposed between the clutch plate 21 and an inner or lower end face of the clutch outer member 19, and fitted on the housing 12 in a manner such that it can move axially but is prohibited from moving circumferentially relative to the housing 12. When the piston 20 is actuated to urge the clutch plate 21 against the clutch outer member 19 via the clutch plate 27, torque is transmitted from the input rotating member 5 to the output rotating member 6, while the piston 20 is returned, power transmission between the input and output rotating members 5, 6 is interrupted.

The governor housing 12 and the clutch piston 20 have their respective peripheral walls formed with hydraulic fluid distributing bores 12b and 20a, which are so located that the hydraulic fluid discharged from the hydraulic pressure chamber 22 via the outlet ports 26 and delivered to the interior of the housing 12 or the space between the housing 12 and the piston 20 is introduced via the distribution bores 12b or 20a to the sliding portions of the clutch plates 21, 27, to thereby sufficiently cool the clutch particularly when the clutch plates 21, 27 are in a half-engaged state. The inlet port 24 is connected via hydraulic fluid selector valve means 41 incorporated in the automatic transmission 3, hereinafter referred to, to an oil pump 29 as a hydraulic fluid supply source, which is driven by the engine.

The starting clutch 1 is composed of an input assembly A and an output assembly B; the input assembly comprises the input shaft 2, the input rotating member 5 (disc 8), the bolt 7, the damper 9, and the control means 11 including the governor housing 12, the cam plate 13, the balls 14, the spring seat member 15 and the spring 16, while the output assembly B comprises the drive shaft 4, the output rotating member 6 including the cylinder 18 and the clutch outer member 19, the pressure regulating valve 10, the piston 20, the clutch plate 21, the spring 23, and the clutch plate 27. The input and output assemblies A, B are individually assembled, and then put together with the clutch plate 27 aligned with the governor housing 12, thereby completing the assemblage of the clutch with ease.

The arrangement of the automatic transmission 3 equipped with the starting clutch 1 constructed as above will now be described. The drive shaft 4, formed by a hollow shaft having opposite open ends, is rotatably supported at its opposite open ends by side walls of a transmission box 30 via ball bearings 31 and 32. Arranged within the box 30 is a driving V-shaped pulley C which is mounted on the drive shaft 4 and has a pitch variable through control of the fluid pressure.

The driving pulley C comprises a disc-shaped stationary element (conical disc) 33 formed integrally on the drive shaft 4 of the starting clutch 1, and a movable element (conical disc) 34 arranged opposite the stationary element 33 and fitted via a plurality of balls 35 on the drive shaft 4 in a manner axially movable but circumferentially immovable relative to the drive shaft 4. The movable pulley element 34 has a cylindrical boss 34a, a disc-shaped main body 34b projecting integrally from one end of the boss 34a, a cylindrical peripheral wall 34c axially projecting integrally from the outer periphery of the main body 34b in a direction away from the immovable conical disc element 33, and an annular plate 34d secured to the inner peripheral surface of a projecting end of the peripheral wall 34c.

Received within the movable pulley element 34 is a stationary piston 36 which has a cylindrical body 36a having one end wall formed with a fitting central bore 36a' and opening at its other end, and an annular radial flange 36b projecting integrally from the other open end of the cylindrical body 36a. The stationary piston 36 is circumferentially and axially immovably fitted on the drive shaft 4 at its fitting bore 36a', and its cylindrical body 36a is loosely fitted around the boss 34a of the movable pulley element 34, while the flange 36b has its outer peripheral surface slidably received in the cylindrical peripheral wall 34c of the movable pulley element 34 in a liquid tight manner. Arranged between a central bore of the annular plate 34d and the cylindrical body 36a of the stationary piston 36 is a hollow cylindrical guide member 37 which has opposite open ends, one of which has a mounting flange 37a secured to an inner side wall surface of the transmission box 30 by means of bolts 38.

A first hydraulic pressure chamber 39 is defined between the main body 34b of the movable pulley element 34 and the flange 36b of the stationary piston 36, while a second hydraulic pressure chamber 40 is defined between the closing plate 34d of the movable pulley element 34 and the flange 36b of the stationary piston 36. These first and second hydraulic pressure chambers 39, 40 are connected through the selector valve means 41 to the oil pump 29.

The hydraulic fluid selector valve means 41 has a bearing cylinder 42 rigidly fitted in one end portion of the drive shaft 4 adjacent the starting clutch 1, a first valve body 43 slidably received within the drive shaft 4 at a location adjacent the bearing cylinder 42 for axial displacement through a predetermined stroke, a second valve body 45 slidably received in the drive shaft 4 for axial displacement through a predetermined stroke and having one end disposed opposite the first valve body 43 and the other end projected into a governor chamber 44 defined outside the one side wall of the transmission box 30, and a third valve body 46 slidably fitted through the bearing cylinder 42, the first valve body 43 and the second valve body 45.

The bearing cylinder 42, which has a closed bottom wall and an open opposite end, is held in position by a stop ring 47 and received in the drive shaft 4 in a liquid-tight manner. The aforementioned orifice or restriction 48 radially extends through the peripheral wall of the bearing cylinder 42 at a predetermined axial location, and communicates with the inlet port 24 of the hydraulic pressure chamber 22 of the starting clutch 1 through a first port 49 radially extending through the peripheral wall of the drive shaft 4, and a gap defined between an annular groove 50 formed in the outer peripheral surface of the drive shaft 4 and the inner peripheral surface of the boss of the clutch cylinder 18.

The first valve body 43 is formed by a cylindrical member with opposite open ends and slidably received at its enlarged end portion within the drive shaft 4 in a liquidtight manner. A hydraulic pressure chamber 43a is defined between the outer peripheral surface of a smaller diameter portion of the first valve body 43 and the inner peripheral surface of the drive shaft 4, and a radial port 51 is formed through the peripheral wall of the smaller diameter portion of the valve body 43 and opens into the hydraulic pressure chamber 43a.

The second valve body 45 is an elongate cylindrical member with opposite open ends, and formed with an annular groove 52 having a predetermined axial length at its axially intermediate portion and a radial port 53 arranged on the side of the first valve body 43 with respect to the annular groove 52 at a predetermined distance therefrom. The second valve body 45 has a smaller diameter portion 45a serving as a spring seat formed at one end thereof facing the first valve body 43. A coiled spring 55 is interposed between the spring seat portion 45a of the second valve body 45 and a spring seat member 54 attached to one end of the first valve body 43 facing the second valve body 45, to urge the first and second valve bodies 43, 45 away from each other, that is, the first valve body 43 toward the starting clutch 1 while the second valve body 45 away from the clutch 1. The second valve body 45 has an enlarged flange 45b formed integrally at its one end projected into the governor chamber 44, against which a governor weight 56 abuts. The governor weight 56 is disposed to pivot about its fulcrum 57 in the counterclockwise direction with an increase in the rotational speed of the engine, to displace the second valve body 45 toward the starting clutch 1 against the urging force of the spring 55.

The third valve body 46 is an elongate cylindrical member opening at one end adjacent the starting clutch 1 and closed at its other end remote from the clutch 1, and slidably fitted through the bearing cylinder 42, the first valve body 43 and the second valve body 45 in a liquidtight manner. The third valve body 46 has a first port 58 radially extending through the peripheral wall of its end portion remote from the starting clutch 1, and a second port 59 radially extending through the peripheral wall of the end portion adjacent the clutch 1. An annular groove 59a is formed in the outer peripheral surface of the third valve body 46 at a location between the first and second ports 58 and 59. The port 51 in the first valve body 43 is disposed to selectively communicate with the second port 59 or with the annular groove 59a.

Connected to the end portion of the third valve body 46 remote from the starting clutch 1 is one end of a rod 61 which is loosely fitted through a hydraulic fluid introducing pipe 62 having opposite open ends, and has its other end projected outside the pipe 62 and pivotably connected to an accelerator control fork 63 by means of a pin 64. The pipe 62 has one end secured to an outer wall 30a of the governor chamber 44 and the other end slidably fitted through the second valve body 45 in a liquidtight manner. The accelerator control fork 63 is arranged in a chamber 44a defined outside the governor chamber 44, and connected to the throttle valve, not shown, of the engine for pivotal movement about the fulcrum 65. As the opening of the throttle valve increases, the fork 63 pivots in the clockwise direction to displace the third valve body 46 away from the starting clutch 1. The control fork chamber 44a communicates via the hydraulic fluid introducing pipe 62 with the interior of the second valve body 45. The third valve body 46 has its outer peripheral surface provided with a ring stopper 66 against which the spring seat member 54 of the first valve body 43 can abut, so that the first valve body 43 is promptly displaced by the ring stopper 66 without delay when the throttle valve is suddenly closed.

The drive shaft 4 has second, third, fourth and fifth ports 67, 68, 69 and 70 radially extending through its peripheral wall and longitudinally arranged in the order mentioned at locations between an axially intermediate portion and an end portion remote from the starting clutch 1. When the pitch of the driving pulley C is maximum, that is, the axial distance between the stationary pulley element 33 and the movable pulley element 34 assumes the maximum value, the second port 67 is located nearly at the middle point between the two pulley elements 33, 34 and opens into the transmission box 30. On the other hand, when the pitch of the driving pulley C assumes the minimum value, that is, the axial distance between the stationary and movable pulley elements 33 and 34 assumes the minimum value, although the boss 34a of the movable pulley element 34 occupies the second port 67, communication between the second port 67 and the transmission box 30 is ensured by a groove 71 formed in the outer peripheral surface of the drive shaft 4. The third port 68 is located at an almost axially central portion of the boss 34a of the movable pulley element 34 when the pitch of the driving pulley C assumes the maximum value, and located adjacent the end of the boss 34a remote from the starting clutch 1 when the gap of the driving pulley C is the minimum.

The third and fourth ports 68, 69 communicate with the first hydraulic pressure chamber 39 defined between the main body 34b of the movable pulley element 34 and the flange 36b of the stationary piston 36, through a gap defined between the inner peripheral surface of the boss of the movable pulley element 34 and an annular groove 72 formed in the outer peripheral surface of the drive shaft 4, and a gap defined between the end face of the boss 34a of the movable pulley element 34 and the inner or upper end face of the cylindrical body 36a of the stationary piston 36. An annular notch 73 is formed the peripheral edge of the lower end face of the boss 34a of the movable pulley element 34, to ensure communication between the annular groove 72 and the first hydraulic pressure chamber 39 when the pitch of the driving pulley C is the maximum, that is, the lower end face of the boss 34a is in contact with the inner or upper end face of the cylindrical body 36a of the stationary piston 36. The third port 68 is disposed to communicate with the port 53 of the second valve body 45 as hereinafter described. The fifth port 70 is located between the outer or lower end face of the cylindrical body 36a of the stationary piston 36 and the bearing 32, and communicates through a notch 74 formed in the outer end face of the cylindrical body 36a and the guide cylinder 37, with the second hydraulic pressure chamber 40 defined between the closing plate 34d of the movable pulley element 34 and the flange 36b of the stationary piston 36. The fourth and fifth ports 69 and 70 can communicate with each other via the annular groove 52 formed in the outer peripheral surface of the second valve body 45, as hereinafter described.

Arranged at a left side of the transmission box 30, as viewed in FIG. 1A, is a V-shaped driven pulley D which is equipped with a pulley pinch force control device according to the invention. A driven shaft 75 is rotatably supported by the opposite side walls of the transmission box 30 via ball bearings 76 and 77. Arranged within the box 30 is a driven pulley D which is mounted on the driven shaft 75 and has a pitch variable through control of the fluid pressure. The driven pulley D comprises a stationary element 78 formed integrally on the driven shaft 75, and a movable element 79 arranged opposite the stationary element 78 and fitted via a plurality of balls 80 around the outer periphery of the driven shaft 75 in a manner axially movable but circumferentially immovable relative to the driven shaft 75.

The movable pulley element 79 has a cylindrical boss 79a, a disc-shaped main body 79b projecting integrally from one end of the boss 79a, a cylindrical peripheral wall 79c axially projecting integrally from a radially intermediate portion of the main body 79b in a direction away from the stationary pulley element 78, and an annular plate 79d secured to an inner peripheral surface of the projecting end of the peripheral wall 79c.

Received within the movable pulley element 79 is a stationary piston 81 which has a boss 81a, a tapered portion 81b projecting integrally from one end of the boss 81a and having an enlarged end, and an annular radial flange 81c projecting integrally from the enlarged end of the tapered portion 81b. The stationary piston 81 is circumferentially and axially immovably fitted on the driven shaft 75 at its boss 81a, and its radial flange 81c has its outer peripheral surface slidably received in the cylindrical peripheral wall 79c of the movable pulley element 79 in a liquidtight manner. A coiled spring 82 is interposed between the main body 79b of the movable pulley element 79 and the flange 81c of the stationary piston 81, to urge the movable pulley element 79 toward the immovable conical element 78, i.e. in a direction of reducing the pitch of the driven pulley D. The spring 82 serves to keep the belt properly taut and bring the movable pulley element 79 to an initial or low speed position when the engine is at rest.

A first hydraulic pressure chamber 83 is defined between the main body 79b of the movable pully element 79, and the tapered portion 81b and flange 81c of the stationary piston 81, while a second hydraulic pressure chamber 84 is defined between the closing plate 79d of the movable pulley element 79 and the tapered portion 81b and flange 81c of the stationary piston 81. These first and second hydraulic pressure chambers 83, 84 communicate with each other via an orifice 85 axially formed through the boss 81a of the stationary piston 81, and the interior of a guide cylinder 86 loosely fitted between the boss 81a and the closing plate 79d of the movable pulley element 79. The guide cylinder 86 is rigidly fitted on the driven shaft 75 for rotation in unison therewith. The first hydraulic pressure chamber 83 is communicated with a hydraulic fluid introducing passage 87 formed through the driven shaft 75 along its axis, via a communication hole 88 radially extending through the peripheral wall of the driven shaft 75.

A plurality of radial through bores $110_1$, $110_2$ and $110_3$, three in the illustrated embodiment, are formed through the peripheral wall of the driven shaft 75 at its axially intermediate portion in a manner axially spaced from each other with predetermined intervals, so as to communicate the interior of the passage 87 with the outside of the driven shaft 75. These through bores $110_1$–$110_3$ are opened and closed by the boss 79a of the movable pulley element 79 as the latter slides on the driven shaft 75.

The passage 87 is connected via a hydraulic fluid introducing pipe 89 having opposite open ends, to a hydraulic fluid inlet port 90. The pipe 89 has a major portion thereof arranged within the passage 87 of the driven shaft 75 and projected at its one end to an axially intermediate portion of the passage 87, while its other end is fitted in a liquidtight manner through a wall portion of the transmission box 30 at a location between the bearing 77 and the inlet port 90.

The hydraulic fluid introducing passage 87 has a portion 87a with a reduced diameter at one side thereof remote from the inlet port 90, a portion 87b with an enlarged diameter at its other side close to the inlet port 90, and a shoulder 87c formed at the boundary between the reduced diameter portion 87a and the enlarged diameter portion 87b. The through bores $110_1$–$110_3$ open at their radially inner ends in the inner peripheral surface of the enlarged diameter portion 87b through which the hydraulic fluid-introducing pipe 89 extends. A slider 111 is axially slidably received within the enlarged diameter portion 87b of the passage 87 for opening and closing the through bores $110_1$–$110_3$ as it axially moves, and formed by a cylindrical piston having a pressure-receiving end surface 112 remote from the inlet port 90 and opening at its other end. The slider 111 has a fitting bore 113 opening in the central portion of the pressure-receiving end surface 112 and extending therethrough along its axis, through which the hydraulic fluid introducing pipe 89 is fitted in a liquidtight manner, allowing sliding of the slider 111 on the pipe 89. The slider 111 is slidably received within the passage 87 in a liquidtight manner.

The slider 111 is urged by a coiled spring 114 as an urging member in a direction of closing the through bores $110_1$–$110_3$, i.e. away from the inlet port 90, to be seated on the shoulder 87c. The spring 114 is loosely arranged around the pipe 89 and interposed between an inner or lower end face of the slider 111 and a spring seat member 115 rigidly fitted on the pipe 89.

The inlet port 90 communicates with a hydraulic fluid supply passage 91 connecting a discharge port 29a of the pump 29 to the control fork chamber 44a. The pump 29 has its suction port 29b connected to a fluid tank 93 via a filter 92.

A return pipe 99 communicates a communication hole 100 formed through a side wall of the transmission box 30 with the fluid tank 93, to return the fluid stored in the transmission box 30 to the tank 93. An endless V-belt 101, formed of a metal such as steel, is wound around the driving pulley C and the driven pulley D, to transmit torque from the former to the latter. The speed reduction ratio between these two pulleys C, D can be varied in an infinite or stepless manner by changing the pitches of the pulleys C, D.

The cylinder bore of the movable pulley element 34 of the driving pulley C, i.e. the inner diameter D1 of the cylindrical peripheral wall 34c, is set at a value larger than the cylinder bore of the movable pulley element 79 of the driven pulley D, i.e. the inner diameter D2 of the cylindrical peripheral wall 79c, that is, D1>D2.

Operation

The infinitely variable transmission equipped with the pulley pinch force control device of the invention operates as follows:

(1) At the Start of Engine

When the output shaft of the engine starts rotating, the input shaft 2 of the starting clutch 1 and accordingly the input rotating member 5 and the control means 11 rotate in unison with the engine output shaft. However, on this occasion, the pressure of fluid supplied from the pump 29 is low and the rotational speed of the input shaft 2 is lower than the predetermined value. Therefore, the centrifugal force acting upon the governor balls 14 of the control means 11 is not large enough to overcome the force of the spring 16 urging the cam plate 13, whereby the outlet ports 26 of the pressure regulating valve 10 remain open. The second valve body 45 is then in a position as illustrated in FIG. 1, with its port 53 disconnected from the third port 68 of the drive shaft 4. The first hydraulic pressure chamber 39 of the driving pulley C is communicated with the second hydraulic pressure chamber 40 of same through the groove 73 of the movable pulley element 34, the annular groove 72, the fourth port 69 of the drive shaft 4, the annular groove 52 of the second valve body 45, the fifth port 70 of the drive shaft 4, and the groove 74 of the stationary piston 36. The third valve body 46 is also in a position as illustrated, with its second port 59 disconnected from the port 51 of the first valve body 43.

The hydraulic fluid from the pump 29 is supplied through the hydraulic fluid supply passage 91, the inlet port 90, the hydraulic fluid-introducing pipe 89, the passage 87, and the communication hole 88, to the first hydraulic pressure chamber 83 of the driven pulley D to fill same with hydraulic fluid, increasing the pressure in the hydraulic fluid introducing passage 87. The slider 111 is urgedly displaced toward the inlet port 90 by the increased fluid pressure in the passage 87 against the urging force of the spring 114, from the position as illustrated in FIG. 1 to a position where it opens the two through bores $110_2$, $110_3$ entirely and closes almost half of the open end of the through bore $110_1$.

The hydraulic fluid from the pump 29 is also supplied to the hydraulic pressure chamber 22 of the starting clutch 1 through the passage 91, the control fork chamber 44a, the hydraulic fluid introducing pipe 62, the interior of the second valve body 45, the first port 58 of the third valve body 46, the interior of the third valve body 46, the interior of the bearing cylinder 42, the orifice 48 of the bearing cylinder 42, the first port 49 of the drive shaft 4, the gap between the clutch cylinder 18 and the annular groove 50 of the drive shaft 4, and the inlet port 24 of the clutch cylinder 18. However, on this occasion the pressure regulating valve 10 is biased by the hydraulic fluid toward the input rotating member 5 with its outlet ports 26 open, thus allowing discharge of the hydraulic fluid through the outlet ports 26 into the interior of the governor housing 12. Therefore, the pressure in the hydraulic pressure chamber 22 of the starting clutch 1 does not increase and accordingly the clutch piston 20 does not urge the clutch plate 21, whereby no torque is transmitted from the input shaft 2 of the clutch 1 to the drive shaft 4, thus holding the driving pulley C and the driven pulley D stationary.

Since the port 53 of the second valve body 45 is then disconnected from the third port 68 of the drive shaft 4 as noted before, no hydraulic fluid is supplied to the first hydraulic pressure chamber 38 of the driving pulley C. Consequently, the movable pulley element 34 is biased in the position remotest from the stationary pulley element 33, whereby the maximum pitch is assumed by the driving pulley C as shown in FIG. 1B.

On the other hand, the hydraulic fluid introduced into the first hydraulic pressure chamber 83 of the driven pulley D from the pump 29 cooperates with the spring 82 to displace the movable pulley element 79 into the position closest to the stationary pulley element 78, to thereby obtain the minimum gap of the driven pulley D as illustrated.

Thus, the driving pulley C is engaged by the belt 101 at its radially innermost portion, while the driven pulley D is engaged by the belt 101 at its radially outermost portion, providing a largest reduction ratio for the transmission.

On this occasion, the slider 111 is in a position where it opens all of the through bores $110_1$–$110_3$ as stated before, while the movable pulley element 79 of the driven pulley D assumes a position where it opens almost half of the open end of the through bore $110_1$, while closing the other two through bores $110_2$, $110_3$. Therefore, part of the hydraulic fluid introduced into the passage 87 flows between the inner peripheral wall of the enlarged diameter portion 87b of the passage 87 and the outer peripheral wall of the pipe 89, and then to the outside of the passage 87 solely through the through bore $110_1$, thereby maintaining the pressure in the passage 87 at a predetermined value.

(2) At the Start of Vehicle

As the accelerator pedal, not shown, of the engine is gradually stepped on to increase the opening of the throttle valve after the start of the engine, the rotational speed of the engine is correspondingly increased. When the engine rotational speed reaches the predetermined value, the centrifugal force acts upon the governor balls 14 to become large enough to radially outwardly displace same to urge the cam plate 13 away from the input rotating member 5 against the urging force of the spring 16, so that the pressure regulating valve 10 is displaced by the cam plate 13 away from the input rotating member 5, i.e. in the direction of closing its outlet ports 26. Therefore, the pressure in the first hydraulic pressure chamber 22 increases to urgingly displace the clutch piston 20 toward the input rotating member 5, which in turn urges the clutch plate 21 against the inner end face of the clutch outer member 19 via the clutch plate 27, whereby torque is transmitted from the input shaft 2 to the drive shaft 4. The driving pulley C thus rotates in unison with the rotating drive shaft 4, and the rotation of the driving pulley C is transmitted via the belt 101 to the driven pulley D which thus rotates in unison with the driven shaft 75, to rotate the driving wheel(s), not shown, of the vehicle with the transmission in the lowest speed reduction ratio position.

(3) At Acceleration of Vehicle

As the accelerator pedal is stepped on after the start of the vehicle to increase the throttle valve opening, the engine speed becomes larger than a predetermined value, the governor weight 56 pivots in the counterclockwise direction to displace the second valve body 45 toward the starting clutch 1 against the urging force of the spring 55, whereby the port 53 of the second valve body 45 is registered with the third port 68 of the drive shaft 4, while communication between the fourth and fifth ports 69, 70 of the drive shaft 4 via the annular groove 52 is interrupted. The hydraulic fluid in the second valve body 45 now flows through the port 53, the third port 68 of the drive shaft 4, the annular groove 72, and the notch 73 of the boss 34a of the movable pulley element 34 into the first hydraulic pressure chamber 39 to increase the internal pressure of the same chamber 39. The increased fluid pressure in the first hydraulic pressure chamber 39 causes the movable pulley element 34 to be displaced from the illustrated position toward the stationary pulley element 33, thereby reducing the pitch of the driving pulley C to forcedly move the belt 101 radially outwardly of the pulley C. Since the cylinder bore D1 of the movable pulley element 34 of the driving pulley C is larger than the cylinder bore D2 of the movable pulley element 79 of the driven pulley D, as mentioned before, the belt 101 applies a larger pressure upon the driving pulley C than upon the driven pulley D. As a result, as the belt 101 moves radially outwardly of the driving pulley C, the movable pulley element 79 of the driven pulley D is displaced away from the stationary pulley element 78 against the fluid pressure in the first hydraulic pressure chamber 83 and the urging force of the spring 82, to thereby allow the belt 101 to be moved radially inwardly of the driven pulley D, increasing the rotational speed of the driven pulley D from a low speed to a middle or a high speed in a stepless manner. That is, the transmission provides a middle speed for the driven pulley D when the belt 101 is positioned at radially central portions of both the driving and driven pulleys C, D, i.e. the pitches of the pulleys C, D are both medium, and provides a high speed for the driven pulley D when the belt 101 is positioned at a radially outermost portion of the driving pulley C with the smallest pitch and at the same time positioned at a radially innermost portion of the driven pulley D with the largest pitch.

As the movable pulley element 79 of the driven pulley D moves away from the stationary pulley element 78 while the vehicle starts accelerating and finally reaches to the highest speed, it opens the through bores $110_1$–$110_3$ one after the other. When the two through bores $110_1$, $110_2$ are thus opened by the movable pulley element 79, hydraulic fluid in the passage 87 flows to the outside through both the through bores $110_1$, $110_2$, resulting in a pressure drop in the passage 87. Consequently, the pressure in the first hydraulic pressure chamber 83 decreases to thereby decrease the pinch force applied to the belt 101 by the movable pulley element 79. The spring 114 overcomes the reduced pressure in the passage 87 to urgingly displace the slider 111 away from the inlet port 90 by an amount corresponding to the pressure drop amount, until it closes the through bore $110_1$ so that the hydraulic fluid in the passage 87 is drained solely through the through bore $110_2$ to the outside. When the movable pulley element 79 further moves away from the stationary pulley element 78 to open all the through bores $110_1$–$110_3$, the hydraulic fluid in the passage 87 flows to the outside through both the through bores $110_2$ and $110_3$, resulting in a further pressure drop in the passage 87 to further decrease the pinch force of the movable pulley element 79, in the same manner as stated before. With the pressure drop in the passage 87, the spring 114 urgingly displaces the slider 111 away from the inlet port 90 by an amount corresponding to the pressure drop, to a position where the slider 111 closes both the through bores $110_1$ and $110_2$ so that the hydraulic fluid in the passage 87 is drained through the through bore $110_3$ alone.

In this way, when the movable pulley element 79 moves away from the stationary pulley element 78, that is, the belt 101 moves radially inward of the driven pulley D, i.e. to a higher speed position, the pinch force applied to the belt 101 by the movable pulley element 79 is kept relatively small.

(4) At Deceleration of Vehicle

When the accelerator pedal is returned from its stepped position to decrease the throttle valve opening, the belt 101 is displaced radially inwardly of the driving pulley C and radially outwardly of the driven pulley D, thus causing deceleration of the vehicle.

As the movable pulley element 79 of the driven pulley D moves toward the stationary pulley element 78 while the vehicle starts decelerating and finally reaches to the lowest speed, the through bores $110_3$–$110_1$ are closed one after the other by the movable pulley element 79. When the through bore $110_3$ is thus closed by the movable pulley element 79, escape of the hydraulic fluid from the passage 87 via the through bore $110_3$ is interrupted, and accordingly the pressure in the passage 87 increases since the other two through bores $110_2$, $110_1$ are then closed by the slider 111. As a result, the pressure in the first hydraulic pressure chamber 83 increases to thereby increase the pinch force of the movable pulley element 79. As the pressure in the passage 87 thus increases, the slider 111 moves toward the inlet port 90 against the urging force of the spring 114, by an amount corresponding to the pressure increase in the passage 87, to a position where it opens the through bore $110_2$ so that the hydraulic fluid in the passage 87 flows via the through bore $110_2$ to the outside. When the movable pulley element 79 further moves toward the stationary pulley element 78 to close the through bore $110_2$ in addition to the bore $110_3$, the hydraulic fluid in the passage 87 is prohibited from escaping via the through bore $110_2$, and therefore the pressure in the passage 87 increases since the other two through bores $110_3$, $110_1$ are then closed, respectively, by the movable pulley element 79 and the slider 111, thus increasing the pinch force of the movable pulley element 79. With the increase of the fluid pressure in the passage 87, the slider 111 moves toward the inlet port 90 against the urging force of the spring 114, by an amount corresponding to the pressure increase in the passage 87, to a position where it opens the through bore $110_1$ so that the hydraulic fluid in the passage 87 is drained via the through bore $110_1$.

In this way, when the movable pulley element 79 moves toward the stationary pulley element 78, that is, the belt 101 moves radially outward of the driven pulley D, i.e. to a lower speed position, the pinch force applied to the belt 101 by the movable pulley element 79 is maintained appropriately large.

(5) At Sudden Start of Vehicle

When vehicle is accelerated in a normal manner by gradually stepping on the accelerator pedal to gradually increase the throttle valve opening, the acceleration control fork 63 coupled to the accelerator pedal pivots in the clockwise direction to slightly displace via the rod 60 the third valve body 46 away from the starting clutch 1, i.e. downward as viewed in FIG. 1B, from the illustrated position, whereby the second port 59 of the third valve body 46 slightly overlaps with the port 51 of the first valve body 43, allowing a small amount of hydraulic fluid to be supplied from the interior of the third valve body 46 to the hydraulic pressure chamber 43a defined between the drive shaft 4 and the first valve body 43 through aligned the ports 59, 51. The hydraulic fluid supplied to the hydraulic pressure chamber 43a causes displacement of the first valve body 43 away from the starting clutch 1 to disconnect its port 51 from the second port 59 of the third valve body 46, to be then stopped and held stationary. This means an increase in the urging force of the spring 55 by an amount corresponding to the displacement of the first valve body 43, thereby slightly restraining the movement of the governor weight 56.

When the accelerator pedal is released from its stepped position to decrease the throttle valve opening, the acceleration control fork 63 is also correspondingly returned to its initial position. The port 51 of the first valve body 43 is now communicated with the annular groove 59a of the third valve body 46 over a slight area, to allow hydraulic fluid in the hydraulic pressure chamber 43a to drain into the transmission box 30 via the port 51, the annular groove 59a, the gap between the third valve body 46 and the drive shaft 4, and the second port 67 of the drive shaft 4 resulting in displacement of the first valve body 43 toward the starting clutch 1, i.e. upward as viewed in FIG. 1B, to interrupt the communication between the port 51 and the annular groove 59a.

In this manner, when the accelerator pedal is operated slowly, the resulting change in the throttle valve opening does not largely affect the movement of the governor. However, when the accelerator pedal is suddenly stepped on to cause an abrupt increase in the throttle valve opening, the third valve body 46 is largely moved away from the starting clutch 1 to cause overlapping of its second port 59 with the port 51 of the first valve body 43 over a large area, thereby allowing a larger amount of the hydraulic fluid to be supplied to the hydraulic pressure chamber 43a. The pressure in the hydraulic pressure chamber 43a thus increases largely above the force of the spring 55 to cause a sudden and large movement of the first valve body 43 away from the starting clutch 1. This sudden movement of the first valve body 43 has much influence over the governor operation, that is, it causes pivotal movement of the governor weight 56 in the clockwise direction, finally moving the pulleys C, D, i.e. the belt 101, into a lower speed-providing position. The governor operation described above can be obtained by setting the overlapping amount of the ports 51, 59, the amount of pivotal displacement of the governor weight 56, the force of the spring 55 etc. at respective suitable values.

When the hydraulic fluid is drained from the first hydraulic pressure chamber 39 into the second hydraulic pressure chamber 40 while the driving pulley C is moving toward a lower speed-providing position, the fluid is biased to a radially outer portion of the second hydraulic pressure chamber 40 due to centrifugal force acting thereupon, whereby the biased fluid forms a reaction to the force acted upon the flange 36b of the stationary piston 36 by the pressure within the first hydraulic pressure chamber 39, thus balancing loads acting upon the opposite end faces of the flange 36b. Similarly, the hydraulic fluid which flows from the first hydraulic pressure chamber 83 of the driven pulley D to the second hydraulic pressure chamber 84 via the orifice 85, is centrifugally biased to a radially outer portion of the second hydraulic pressure chamber 84, thereby balancing loads acting upon the opposite end faces of the flange 81c of the stationary piston 81.

When the first valve body 43 is displaced to such a position as to communicate its port 51 with the annular groove 59a of the third valve body 46, hydraulic fluid in the hydraulic pressure chamber 43a is drained through the port 51 and the annular groove 59a into the transmission box 30, so that the first and second valve bodies 43, 45 are returned to the initial positions by the resultant force of the governor weight 56 and the spring 55. Therefore, hydraulic fluid in the first hydraulic pressure chamber 39 is prevented from flowing into the second hydraulic pressure chamber 40, to thereby impede further movement of the driving pulley C toward a lower speed-providing position, that is, excessive deceleration.

Figure 2:
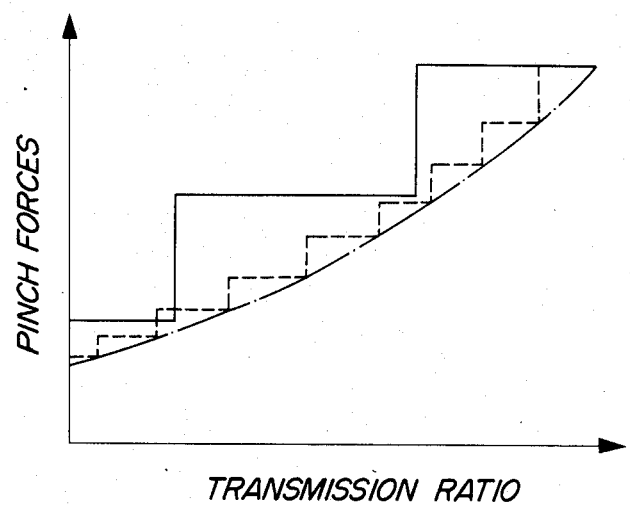
FIG. 2 is a graph showing the relationship between pinch forces produced by a conventional pulley pinch force control device and by the device according to the invention, and the transmission ratio of the transmission.

As is learned from the foregoing description, the pulley pinch force control device according to the invention is simple in structure to facilitate layout of the component parts, but yet capable of controlling the pinch force of the movable pulley element to required levels in a stepwise manner in dependence upon the transmission ratio of the transmission, as shown in FIG. 2, which shows the relationship between pinch forces produced by the pulley pinch force control device according to the invention and by a conventional device, and the transmission ratio of the transmission, wherein the solid line indicates a pinch force characteristic obtained by the device according to the FIGS. 1A and 1B embodiment, the broken line a pinch force characteristic obtained by a modified device according to the invention in which the through bores 110 are increased in number, and the one-dot chain line a characteristic obtained by a conventional device, respectively. Besides, according to the invention, the movable pulley element is not subjected to an excessive pinch force so as to maintain the tensile force of the belt at a proper value, to thereby prolong the effective lives of the pulley and the belt. Further, the slider 111 is arranged within the pulley shaft 75, and the through bores 110 are formed through the shaft 75 to be opened and closed by the movable pulley element 75, making it possible to design the device compact in size with a reduced number of component parts and reduce the manufacturing cost. The pulley pinch force control device of the invention requires no regulator means for regulating the discharge pressure of the pump 29, resulting in a further reduction of the manufacturing cost. Further, if oil is used as a hydraulic fluid, the belt 101 can be sufficiently lubricated by oil flowing out of the through bores 110 located radially inward of the belt 101, and directed toward same. Therefore, it is not necessary to provide an independent oil feeding system for the belt, making the transmission simple in structure and reducing the manufacturing cost. Further, merely by appropriately selecting the force of the spring 114 applied to the slider 111 and the locations of the through bores 110, a desired pinch force characteristic of the pulley can be obtained which matches the transmission ratio of the transmission.

What is claimed is:

1. In an infinitely variable transmission equipped with a pulley including a shaft having a hydraulic fluid introducing passage formed therein and a peripheral wall, a stationary pulley element provided on said shaft, a movable pulley element axially slidably fitted on said shaft and arranged opposite said stationary pulley element, a hydraulic pressure chamber communicating with said hydraulic fluid introducing passage and disposed to be supplied with a hydraulic fluid for urging said movable pulley element toward said stationary pulley element, a hydraulic fluid source for supplying said hydraulic fluid to said hydraulic pressure chamber, and an endless belt engaged between said stationary pulley element and said movable pulley element, a control device for controlling the pinch force of said movable pulley element, comprising: a plurality of through bores formed through said peripheral wall of said shaft in a manner axially spaced from each other with predetermined intervals, for communicating said hydraulic fluid introducing passage with the outside of said shaft, said through bores being disposed such that said movable pulley element is urged by said hydraulic fluid in said hydraulic pressure chamber in a direction of closing said through bores, and at the same time urged by a force of said endless belt acting thereupon against said hydraulic fluid in said hydraulic pressure chamber, in a direction of opening said through bores; a slider member axially slidably received within said hydraulic fluid introducing passage for opening and closing said through bores, said slider member having a pressure-receiving end surface urged by said hydraulic fluid in said hydraulic fluid introducing passage; and urging means urging said slider member in a direction of closing said through bores against the pressure of said hydraulic fluid acting upon said pressure-receiving end surface of said slider member; wherein the total opening area of said through bores is variable in response to a change in the position of said slider member which is determined by a difference between the pressure of said hydraulic fluid in said hydraulic fluid introducing passage and the urging force of said urging means, as well as to a change in the position of said movable pulley element which is determined by a difference between the pressure of said hydraulic fluid in said hydraulic pressure chamber and the force of said endless belt acting upon said movable pulley element, to cause a stepwise change of pressure in said hydraulic fluid introducing passage and accordingly pressure in said hydraulic pressure chamber, to thereby control the pinch force of said movable pulley element applied to said endless belt.

2. A control device as claimed in claim 1, wherein said infinitely variable transmission includes a second pulley having a second shaft, a second stationary pulley element provided on said second shaft, and a second movable pulley element axially slidably fitted on said second shaft and arranged opposite said second stationary pulley element, said endless belt being engaged between said second stationary pulley element and said second movable pulley element, the first-mentioned pulley and said second pulley being arranged to act, respectively, as a driven pulley and a driving pulley.

3. A control device as claimed in claim 1, wherein said hydraulic fluid introducing passage has a first portion with a reduced diameter extending from an axially intermediate portion thereof to one end thereof, a second portion with an enlarged diameter extending from said axially intermediate portion thereof to another end thereof, and a shoulder formed between said first portion and said second portion, said slider member being slidably received within said second portion, said urging means being arranged in said second portion and urging said slider member in a direction of causing same to be seated on said shoulder, said through bores being formed in said peripheral wall of said shaft at such locations that they are all closed by said slider member when said slider member is seated on said shoulder.

4. A control device as claimed in claim 3, including a pipe member arranged within said second portion of said hydraulic fluid introducing passage and connected to said hydraulic fluid source, for guiding said hydraulic fluid therefrom to said first portion, said pipe member being fitted through a fitting bore formed through said slider member along an axis thereof, in such a manner that said slider member is allowed to slide on said pipe member, and communication passage means communicating said first portion of said hydraulic fluid introducing passage with said hydraulic pressure chamber.

* * * * *